US007669427B2

(12) United States Patent  (10) Patent No.: US 7,669,427 B2
Walker et al.  (45) Date of Patent: Mar. 2, 2010

(54) TEMPERATURE CALIBRATION DEVICE DRIVING HEATING/COOLING MODULES IN A MANNER TO ALLOW OPERATION OVER WIDE TEMPERATURE RANGE

(75) Inventors: Richard W. Walker, Alpine, UT (US); Frank E. Liebmann, American Fork, UT (US)

(73) Assignee: Fluke Corporation, Everett, WA (US)

( * ) Notice: Subject to any disclaimer, the term of this patent is extended or adjusted under 35 U.S.C. 154(b) by 627 days.

(21) Appl. No.: 11/453,781

(22) Filed: Jun. 14, 2006

(65) Prior Publication Data
US 2007/0291815 A1 Dec. 20, 2007

(51) Int. Cl.
*F25B 21/02* (2006.01)
(52) U.S. Cl. .............................. 62/3.7; 62/3.2; 62/259.2
(58) Field of Classification Search .................... 62/3.2, 62/3.3, 3.7, 259.2
See application file for complete search history.

(56) References Cited

U.S. PATENT DOCUMENTS 5,940,784 A * 8/1999 El-Husayni ................. 702/130

6,230,497 B1 * 5/2001 Morris et al. ................. 62/3.7

OTHER PUBLICATIONS

Ferrotec America Corporation, "*Thermoelectric Modules Reliability Report*", Issue 1, Apr. 2001, pp. 1-12.

* cited by examiner

*Primary Examiner*—Melvin Jones
(74) *Attorney, Agent, or Firm*—Dorsey & Whitney LLP

(57) ABSTRACT

A temperature calibration device uses Peltier cells for heating and cooling. The Peltier cells are driven by a power controller that gradually changes the power applied to the Peltier cells from a starting power to a target power. However, during this transition, the power controller holds the power applied to the Peltier cells constant for a period to minimize the stress on the Peltier cells. This period of constant period may last until the temperature of an object reaches a predetermined temperature, or it may have a fixed or variable duration, which may be based on the difference between the starting power and the target power. By changing the power applied to the Peltier cells in this manner, the useful life of the Peltier cells is preserved.

25 Claims, 6 Drawing Sheets

TEMPERATURE CALIBRATION DEVICE DRIVING HEATING/COOLING MODULES IN A MANNER TO ALLOW OPERATION OVER WIDE TEMPERATURE RANGE

TECHNICAL FIELD

This invention relates to electrically powered devices, and, more particularly, to temperature calibration devices using Peltier cells to provide heating and cooling.

BACKGROUND OF THE INVENTION

A wide variety of electrically powered heating devices are in existence to provide a wide variety of functions. For example, temperature calibration devices, known as dry-well calibrators, are commonly used in industry to calibrate precision temperature probes.

Conventional dry-well calibrators use Peltier heating/cooling modules generally containing Peltier cells to heat or cool the temperature probes to temperatures that can be set by a user. Electrical current having one polarity is driven through the Peltier cells to cause the temperature of the first substrate to rise relative to the temperature of the second substrate, thereby heating the temperature probe being calibrated. Electrical current having the opposite polarity causes the temperature of the first substrate to fall relative to the temperature of the second substrate, thereby cooling the temperature probe being calibrated. A current is produced by applying an electrical potential across a Peltier cell. A Peltier cell has a specified maximum current. Operating a Peltier cell near or above its maximum current can cause premature performance degradation or failure. Therefore, a limiting factor in the operating range of a dry-well calibrator is the maximum current of the Peltier cells used in the dry-well calibrator. To maximize the operating range of dry-well calibrators, the Peltier cells are frequently driven as close as possible to their maximum current without substantially shortening their lifetime. The current that flows depends on the potential, the resistance of the Peltier cell, and the temperature differential across the Peltier cell. Applying a voltage to a Peltier cell while it has an opposing temperature differential can result in excessive current through the Peltier cell. Specifically, if Peltier cells are still cold when the polarity of power is abruptly switching to induce heating, the cold cells will produce a voltage that effectively increases the heating voltage applied to the cells, thereby potentially inducing excessive current. The same phenomena can occur when quickly transitioning from heating to cooling. It is often necessary to quickly transition dry-well calibrators from heating to cooling, or vice-versa. Sometimes this transition is from full maximum heating to full maximum cooling. During this transition time, until the temperature differentials settle, it is possible for the Peltier cells to temporarily experience excessive current unless means are taken to prevent it.

Peltier cells used in dry-well calibrators are usually stacked on top of each other to provide heating and cooling over a range of temperatures that is wider than this temperature differential of each cell. The total temperature differential of a heating/cooling system is substantially equal to the sum of the temperature differentials that can be developed across all of the stacked Peltier cells. The temperature differential that can be developed between the substrates of each Peltier cell is limited to a specified maximum temperature. Operating a Peltier cell near or above its maximum temperature can cause premature performance degradation or failure. Therefore, a limiting factor in the operating range of a dry-well calibrator is the maximum specified temperature differential of the Peltier cells used in the dry-well calibrator. To maximize the operating range of dry-well calibrators, the Peltier cells are frequently driven as close as possible to their maximum temperature differentials without substantially shortening their lifetime. During a transition from heating to cooling or vice-versa, until the temperature differentials settle, it is possible for some of the Peltier cells in the stack to temporarily experience excessive temperature differentials unless means are taken to prevent it.

Operation of the Peltier cells near or above their maximum specifications can severely limit the useful lives of the cells. Frequent replacement of the Peltier cells can be very expensive, not only because of the cost of the cells, but also because of the cost of labor required to disassemble dry-well calibrators to replace the cells and the downtime costs during such replacement. As a result, there is an inevitable tradeoff between achieving a wide operating range and achieving reliable performance. Even where the Peltier cells are not frequently driven to high maximum temperature differentials, their useful lifetimes can be unreasonably short. It has been recognized that this shortening in the useful life of the Peltier cells can be caused by abruptly changing between heating and cooling functions, particularly between full maximum heating and full maximum cooling. However, despite procedures to simply limit the rate at which the applied potential changes when transitioning from heating to cooling and vice-versa, it is still possible for the maximum current and temperature differential of the Peltier cells to be temporarily exceeded and the useful life of Peltier cells can be unduly limited.

There is therefore a need for a dry-well calibrator using Peltier cells that applies power to the Peltier cells in a manner that does not unduly shorten their useful life.

SUMMARY OF THE INVENTION

A temperature calibration device includes a block of thermally conductive material that is placed in thermal communication with a device to be calibrated. The block is in thermal contact with a plurality of Peltier cells that receive power from a power controller. The power controller is structured to intelligently limit the magnitude and polarity of the electrical potential applied to the Peltier cells during transition from one temperature to another. The result is that the starting potential applied to the Peltier cells from a starting temperature changes to one or more or continuous intermediate levels of potential while in transition before the final level of potential is applied to produce the target temperature. The magnitudes and polarities of the intermediate potentials and the duration at each potential may be determined by a variety of techniques. For example, the magnitude and polarity of the potential may be a continuous function of the temperature of the block, or a period of constant intermediate potential may last until the block reaches a certain temperature, or an intermediate potential may be of predetermined duration. The intermediate potentials may also depend on other conditions, such as the difference between the starting power and the target power. After the period of intermediate power, the power controller is structured to change the power applied to the Peltier cells to a target power. As a result of this scheme, during transition from one temperature to another, the limited power prevents excessive temperature differentials from developing and also prevents excessive current through the Peltier cells.

DETAILED DESCRIPTION

Embodiments of the present invention are directed to a system and method for allowing a dry-well calibrator to operate over a wide range of temperatures without adversely affective the service life of Peltier cells used in the dry-well calibrator. Certain details are set forth below to provide a sufficient understanding of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
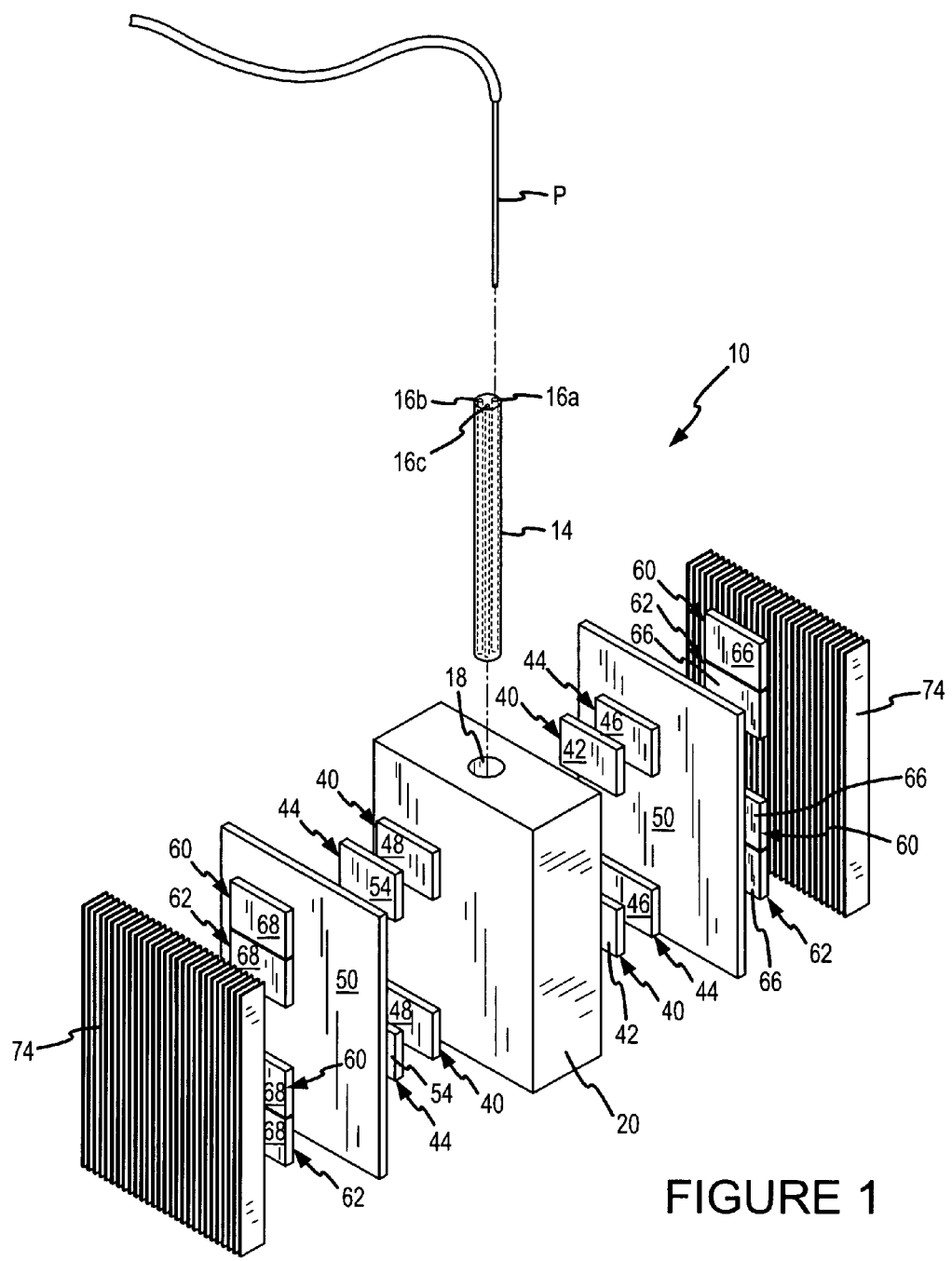
FIG. 1 an exploded isometric view of some of the internal components of a dry-well calibrator according to one example of the invention.

The internal components of a heating block assembly for a typical dry-well calibrator 10 are shown in FIG. 1. The dry-well calibrator 10 includes a cylindrical insert 14 having one or more cylindrical bores 16a,b,c sized to receive temperature probes "P" having corresponding dimensions. The insert 14 is typically manufactured from a thermally conductive metal. The insert 14 fits into a cylindrical bore 18 formed in a heated block 20 of a suitable material, such as a metal with good thermal conduction properties. The block 20 has a configuration that is rectangular in both vertical and horizontal cross-section, although, of course, it may also have a square, round or other configuration. The inside diameter of the bore 18 is only slightly larger than the outside diameter of the insert 14 to ensure good heat conduction from the block 20 to the insert 14.

Figure 2:
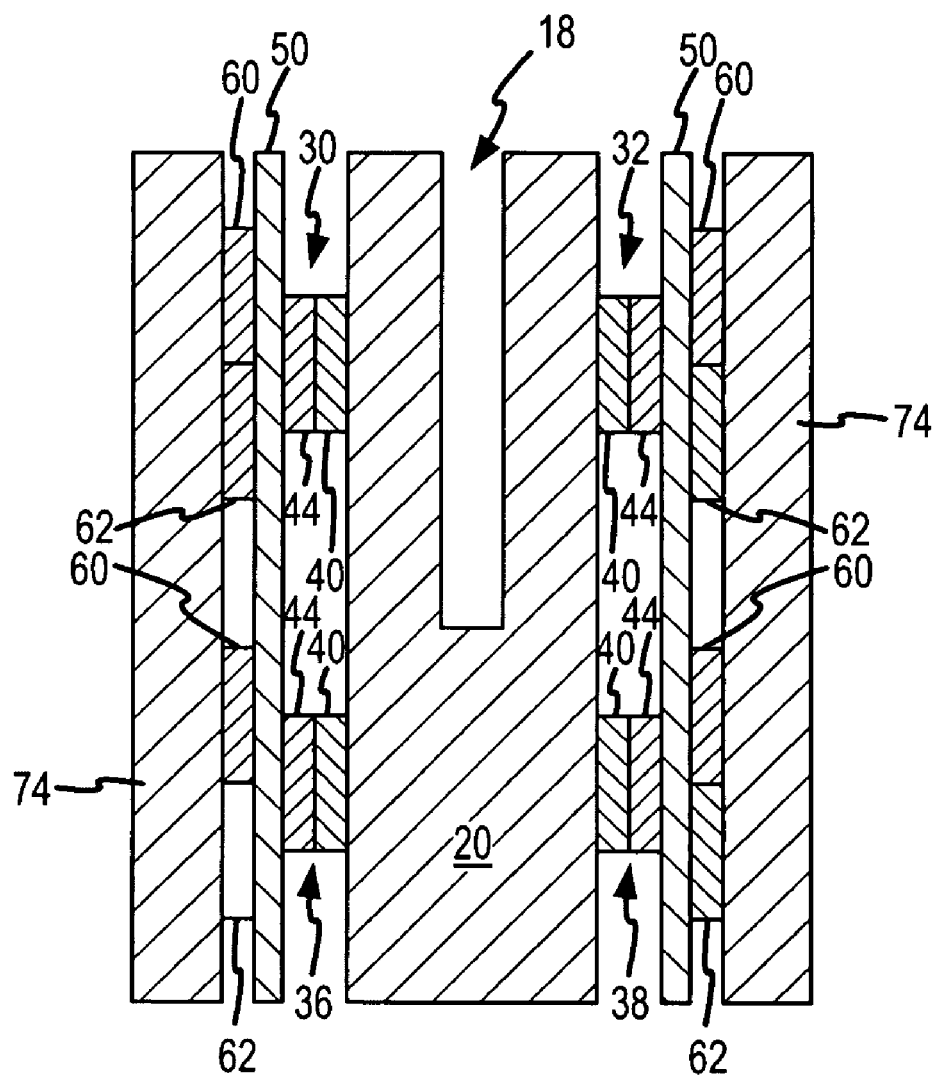
FIG. 2 is a cross-sectional view of the internal components of the dry-well calibrator shown in FIG. 1.

With reference also to FIG. 2, a pair of upper Peltier heating/cooling modules 30, 32 and a pair of lower Peltier heating/cooling modules 36, 38 are bonded to opposite surfaces of the block 20. Each of the Peltier heating/cooling modules 30-38 includes a first Peltier cell 40 having an inner substrate 42 (FIG. 1) bonded to the block 20. A second Peltier cell 44 has an inner substrate 46 (FIG. 1) that is bonded to an outer substrate 48 (FIG. 1) of the first cell 40. Temperature conductive plates 50 are bonded to outer substrates 54 (FIG. 1) of the second cells 44. A pair of Peltier cells 60, 62 each having inner and outer substrates 66, 68, respectively, (FIG. 1) have their inner substrates 66 bonded to an outer surface of the plates 50. The Peltier cells 60, 62 are positioned so that their abutting edges overlie the centers of the first and second Peltier cells 40, 44. Finally, conductive leads (not shown) supply electrical power to the Peltier cells 40, 44, 60, 62. As is well-known in the art, electrical power having one polarity causes the temperature of the inner substrates to rise relative to the temperature of the outer substrates thereby heating the block 20. Electrical power having the opposite polarity causes the temperature of the inner substrates to fall relative to the temperature of the outer substrates, thereby cooling the block 20. When the Peltier cells 40, 44, 60, 62 are used for either heating or cooling, the resulting temperature changes imparted to the outer surfaces 68 of the Peltier cells are moderated by heat sinks 74 abutting the outer substrates 68 (FIG. 1) of the cells 60, 62.

Figure 3:
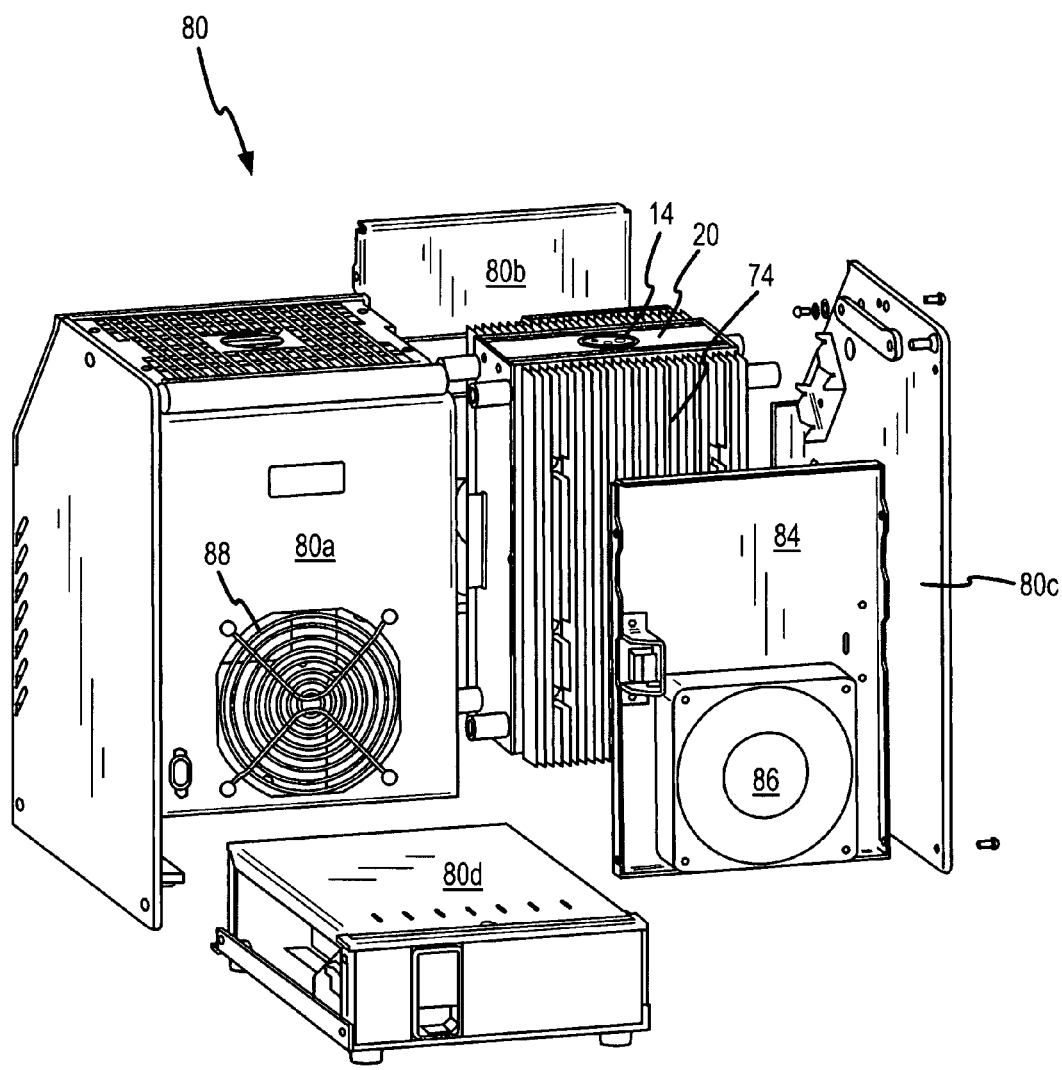
FIG. 3 is an exploded isometric view of a case surrounding the internal components of the dry-well calibrator shown in FIG. 1.

With reference also to FIG. 3, the above-described components of the dry-well calibrator 10 are surrounded by an outer case 80 formed by case sections 80a,b,c,d. A fan board 84 containing a fan 86 is positioned inside the case section 80a so that the fan 86 is behind a grill 88. The case 80 is separated from the heat sinks 74 by an insulating space, and the fan 86 provides airflow through this insulating space to remove heat from or supply heat to the heat sinks 74.

Figure 4:
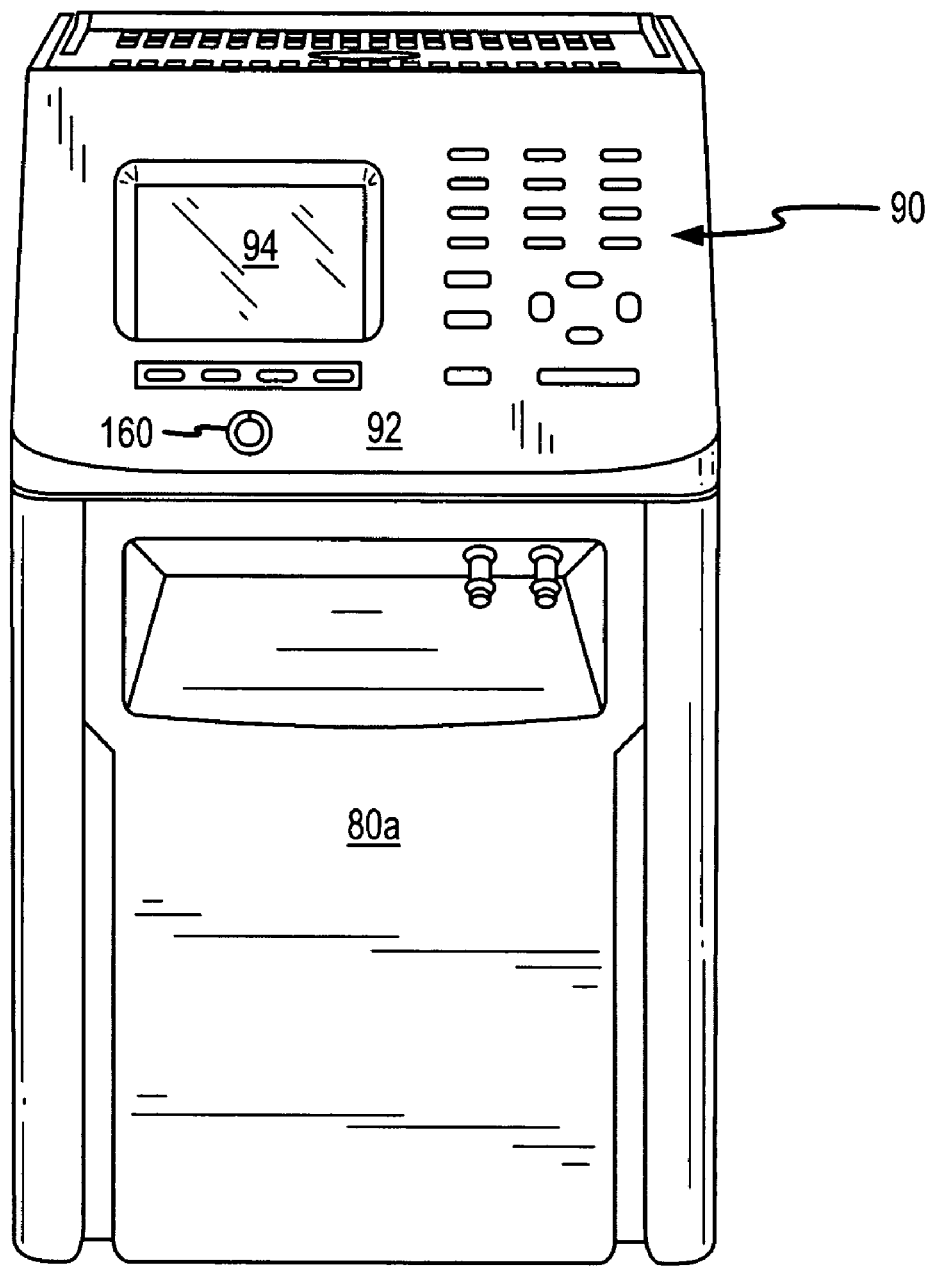
FIG. 4 is a front elevational view of the dry-well calibrator of FIG. 1.

As best shown in FIG. 4, a keypad 90 mounted on a panel 92 of the case section 80a is connected to the control circuitry (FIG. 6) to control the operation of the dry-well calibrator 10. A display 94, which is also connected to the control circuitry provides information about the operation of the dry-well calibrator 10, such as the temperature of the block 20.

In operation, the keypad 90 (FIG. 4) is used to set the temperature of the block 20 as well as the rate at which the temperature of the block 20 is changed to reach the set temperature. If the temperature set by the keypad 90 is for a temperature above ambient temperature, power having a first polarity is applied to wires that are connected to the Peltier cells 40, 44, 60, 62, thereby causing the cells to cool the block 20. If the temperature set by the keypad 90 is for a temperature below ambient temperature, power having a first polarity is applied to wires that are connected to the Peltier cells 40, 44, 60, 62 to cause the cells to cool the block 20. Once the temperature of the block 20 has stabilized, the temperature probe P (FIG. 1) is inserted into a corresponding sized bore 16 of the insert 14. The probe P is then calibrated by ensuring that a readout device (not shown) connected to the probe P indicates the temperature of the probe P is equal to the set temperature of the dry-well calibrator 10.

As explained above, the useful life of the Peltier cells 40, 44, 60, 62 can be drastically reduced by operating them at or near their maximum specified temperature differentials and by abruptly changing them between full heating power and full cooling power. To minimize this damage, it is known to keep the Peltier cells 40, 44, 60, 62 at lower temperature differentials and avoid abrupt changes in current through the Peltier cells 40, 44, 60, 62. It has been discovered that Peltier cell damage can also be reduced by keeping the power applied to the Peltier cells 40, 44, 60, 62 at or close to zero for a short period when transitioning from heating to cooling and vice-versa.

Figure 5A:
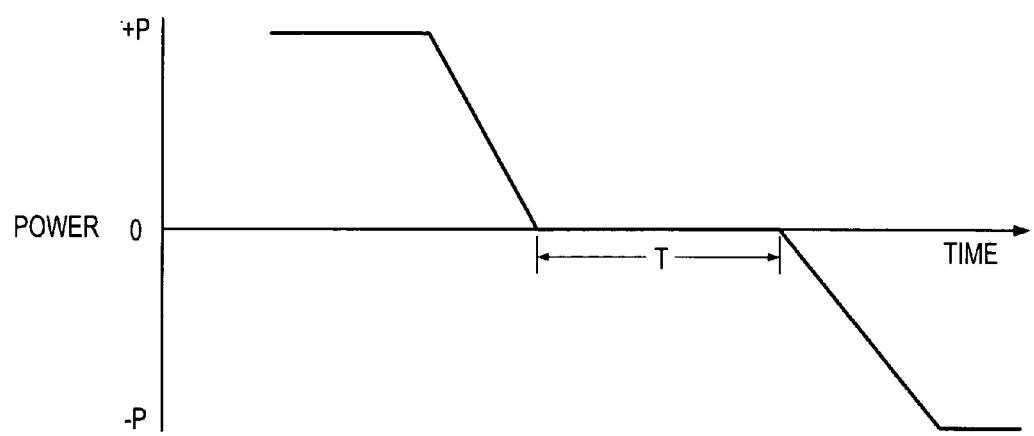
FIGS. 5A-C are graphs showing the manner in which power is applied to the Peltier cells in the dry-well calibrator of FIGS. 1-4 according to one example of the invention.

The power level of this constant heating or cooling power ideally depends on the starting power from which the calibrator 10 is transitioning and a target power to which the calibrator 10 is transitioning. For example, as shown in FIG. 5A, if the dry-well calibrator 10 is transitioning from a very high heating power to a very high cooling power, the period of constant power level may be at a level in which no power is being applied to the Peltier cells 40, 44, 60, 62. In one embodiment of the invention, the power remains at the constant power level for a predetermined period of time. However, the duration "T" of this predetermined period of time may be a function of the difference between the starting power and the target power. In another embodiment of the invention, the power remains at the constant power level until the temperature of the block 20 reaches a predetermined temperature. For example, this predetermined temperature can be midway between the starting temperature and the target temperature.

Figure 5B:
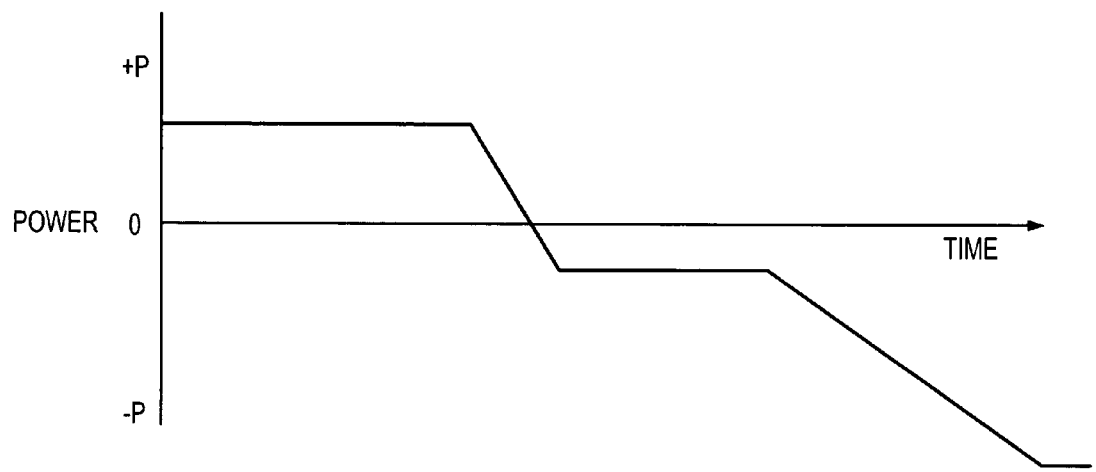

Another example is shown in FIG. 5B. In this example, the starting power is a moderately high heating power and the target power is a very high cooling power. The period of constant power during this transition is therefore at a power that causes the Peltier cells 40, 44, 60, 66 to cool the dry-well calibrator 10.

Figure 5C:
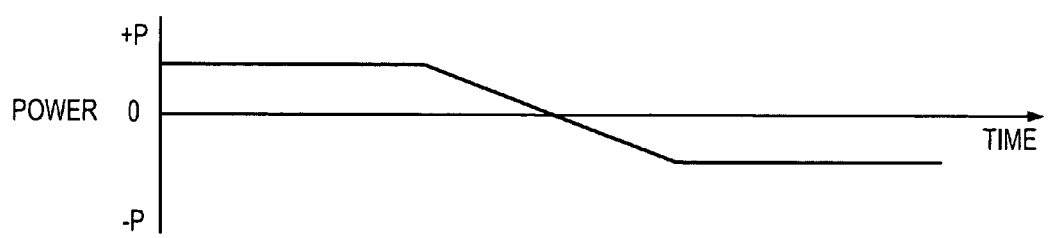

A final example is shown in FIG. 5C in which the starting power is a slight heating power and the target power is a slight cooling power. In such case, relatively little stress is imposed on the Peltier cells 40, 44, 60, 66, particularly if, as shown in FIG. 5C, the power is gradually changed from a heating level to a cooling level. Therefore, it is not necessary to maintain the power to the Peltier cells 40, 44, 60, 66 constant for a period of time when transitioning from heating to cooling.

Figure 6:
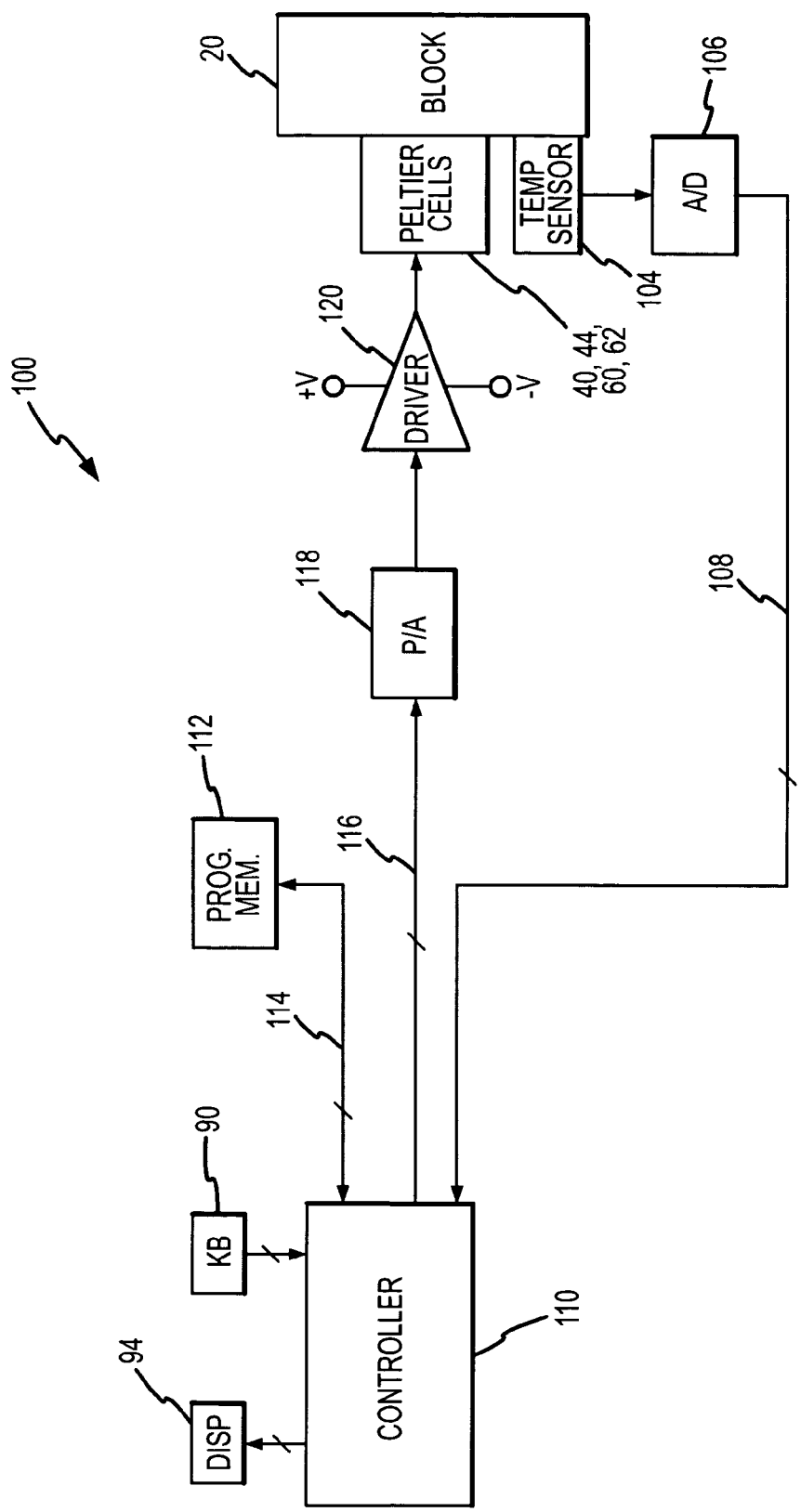
FIG. 6 is a block diagram of a system for driving Peltier cells in the dry-well calibrator of FIGS. 1-4 according to one example of the invention.

A control system 100 for driving the Peltier cells 40, 44, 60, 66 according to one example of the invention is shown in FIG. 6. The control system 100 includes a temperature sensor 104 mounted on a surface to be monitored, such as the block 20 (FIGS. 1-3). The temperature sensor 104 provides an analog signal indicative of the temperature of the block 20. This analog signal is applied to an analog-to-digital ("A/D") converter 106, which outputs a plurality of bits on a bus 108 indicative of the temperature of the block 20. These bits are applied to a controller 110, which may be implemented by conventional means, such as a properly programmed microprocessor. The controller 110 executes a program stored in a read-only memory ("ROM") 112, which is connected to the controller 110 by address, control and data buses 114. The controller 110 receives user commands from the keypad 90 (FIG. 4) and applies signals to the display 94 for providing information to the user, as explained above. The controller 110 also outputs a plurality of bits on a bus 116 to a digital-to-analog ("D/A") converter 118. The D/A converter 118 outputs a corresponding positive or negative analog signal to a power driver 120, which, outputs corresponding voltage to the Peltier cells 40, 44, 60, 66. As previously explained, the polarity of the voltage determines whether the Peltier cells 40, 44, 60, 62 will heat the block 20 or cool the block 20, and the magnitude of the voltage determines the heating or cooling power.

In operation, it is assumed that the control system 100 is operating in a heating mode to regulate the temperature of the block 20 at a preset value using feedback applied to the controller 110 from the temperature sensor 104 through the A/D converter 106. The user then enters a command through the keypad 90 to set the target temperature to which the block 20 should be heated or cooled. Based on this starting temperature and the target temperature set by the keypad 90, the controller 110 determines a timed power schedule at which power will be applied to the Peltier cells 40, 44, 60, 66. This power schedule includes not only the slew rate, i.e., the rate at which the voltage from the power driver 120 will change, but also a target power level and the intermediate power level that will be applied during the constant power period. In the control system 100 shown in FIG. 6, when the voltage output from the power driver 120 reaches a voltage corresponding to the constant, intermediate power level, the voltage remains constant until the temperature of the block 20 reaches a predetermined temperature. In the system 100, this predetermined temperature is midway between the starting temperature and the target temperature. However, in other embodiments of the invention, the predetermined temperature may be determined in another manner, and the duration of the constant power period may be of fixed duration or it may be determined by other means. For example, as mentioned above, the duration of this period of constant power may be a function of the difference between the starting power or temperature and the target power or temperature.

By applying power to the Peltier cells 40, 44, 60, 66 in a manner that maintains the power constant for a period during transitions between heating and cooling, the dry-well calibrator 10 can operate over a wide temperature range without unduly limiting the useful life of the Peltier cells or otherwise degrading their performance.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

We claim:

1. A method of operating a temperature calibration device having a plurality of Peltier cells to heat or cool an object in thermal communication with the Peltier cells from a starting temperature to a target temperature, the method comprising:
    applying a voltage to the Peltier cells that makes the temperature of the object substantially equal to the starting temperature;
    changing the voltage applied to the Peltier cells to an intermediate voltage;
    holding the voltage applied to the Peltier cells at the intermediate voltage; and
    after holding the voltage applied to the Peltier cells at the intermediate voltage, changing the voltage applied to the Peltier cells to a voltage that makes the temperature of the object substantially equal to the target temperature.

2. The method of claim 1 wherein the act of holding the voltage applied to the Peltier cells at the intermediate voltage comprises holding the voltage applied to the Peltier cells at the intermediate voltage until the temperature of the object reaches an intermediate temperature.

3. The method of claim 2 wherein the intermediate temperature comprises a temperature midway between the starting temperature and the target temperature.

4. The method of claim 1 wherein the act of holding the voltage applied to the Peltier cells at the intermediate voltage comprises holding the voltage applied to the Peltier cells at the intermediate voltage for a period of predetermined duration.

5. The method of claim 4 wherein the predetermined duration is a function of the temperature difference between the starting temperature and the target temperature.

6. The method of claim 4 wherein the predetermined duration is a function of the difference between the voltage applied to the Peltier cells to make the temperature of the object substantially equal to the starting temperature and the voltage applied to the Peltier cells to make the temperature of the object substantially equal to the target temperature.

7. The method of claim 6 wherein the voltage applied to the Peltier cells to make the temperature of the object substantially equal to the starting temperature has a magnitude that is substantially greater than the voltage applied to the Peltier cells to make the temperature of the object substantially equal to the target temperature, and wherein the intermediate voltage has the same polarity as the voltage applied to the Peltier cells to make the temperature of the object substantially equal to the starting temperature.

8. The method of claim 1 wherein the intermediate voltage comprises zero volts.

9. The method of claim 1 wherein the acts of changing the voltage applied to the Peltier cells to an intermediate voltage and, after holding the voltage applied to the Peltier cells at the intermediate voltage, changing the voltage applied to the Peltier cells to a voltage that makes the temperature of the object substantially equal to the target temperature comprises gradually changing the voltage applied to the Peltier cells.

10. A method of operating a temperature calibration device having a plurality of Peltier cells to heat or cool an object in thermal communication with the Peltier cells, the method comprising:
    applying a starting power to the Peltier cells;
    changing the power applied to the Peltier cells from the starting power to an intermediate power;
    holding the power applied to the Peltier cells at the intermediate power for a period of constant power; and
    after holding the power applied to the Peltier cells at the intermediate power for the period of constant power, changing the power applied to the Peltier cells to a target power.

11. The method of claim 10 wherein the act of holding the power applied to the Peltier cells at the intermediate power for the period of constant power comprises holding the power applied to the Peltier cells at the intermediate power until the temperature of the object reaches an intermediate temperature.

12. The method of claim 11 wherein the intermediate temperature comprises a temperature midway between a starting temperature and a target temperature.

13. The method of claim 10 wherein the period of constant power has a predetermined duration.

14. The method of claim 13 wherein the predetermined duration is a function of the temperature difference between a starting temperature and a target temperature.

15. The method of claim 13 wherein the predetermined duration is a function of the difference between the starting power and the target power.

16. The method of claim 15 wherein the starting power is substantially greater than the target power, and wherein a voltage applied to the Peltier cells at the intermediate power has the same polarity as a voltage applied to the Peltier cells at the starting power.

17. The method of claim 10 wherein the intermediate power comprises zero volts.

18. The method of claim 10 wherein the act of changing the power applied to the Peltier cells from the starting power to the intermediate power comprises gradually changing the power applied to the Peltier cells from the starting power to the intermediate power.

19. The method of claim 10 wherein the act of changing the power applied to the Peltier cells from the intermediate power to the target power comprises gradually changing the power applied to the Peltier cells from the intermediate power to the target power.

20. A temperature calibration device, comprising:
    a block of thermally conductive material that is structured to be placed in thermal communication with a device to be calibrated;
    a plurality of Peltier cells in thermal contact with the block of thermally conductive material;
    a power controller coupled to the Peltier cells, the power controller being structured to apply power to the Peltier cells and to change the power applied to the Peltier cells from a starting power to an intermediate power, to hold the power applied to the Peltier cells at the intermediate power for a period of constant power, and to then change the power applied to the Peltier cells to a target power; and
    a temperature sensor coupled to the power controller and in thermal communication with the block of thermally conductive material, the power controller being structured to hold the power applied to the Peltier cells at the intermediate power until the temperature of the object indicated by the temperature sensor reaches an intermediate temperature, the power controller being structured to calculate the intermediate temperature as a temperature midway between a starting temperature and a target temperature.

21. A temperature calibration device, comprising:
    a block of thermally conductive material that is structured to be placed in thermal communication with a device to be calibrated;
    a plurality of Peltier cells in thermal contact with the block of thermally conductive material; and
    a power controller coupled to the Peltier cells, the power controller being structured to apply power to the Peltier cells and to change the power applied to the Peltier cells from a starting power to an intermediate power, to hold the power applied to the Peltier cells at the intermediate power for a period of constant power, and to then change the power applied to the Peltier cells to a target power, wherein the power controller is structured to hold the power applied to the Peltier cells at the intermediate power for a period having a predetermined duration.

22. The temperature calibration device of claim 21 wherein the power controller is structured to determine the predetermined as a function of the difference between the starting power and the target power.

23. A temperature calibration device, comprising:
    a block of thermally conductive material that is structured to be placed in thermal communication with a device to be calibrated;
    a plurality of Peltier cells in thermal contact with the block of thermally conductive material; and
    a power controller coupled to the Peltier cells, the power controller being structured to apply power to the Peltier cells and to change the power applied to the Peltier cells from a starting power to an intermediate power, to hold the power applied to the Peltier cells at the intermediate power for a period of constant power, and to then change the power applied to the Peltier cells to a target power, wherein the power controller is structured to gradually change the power applied to the Peltier cells from the starting power to the intermediate power.

24. A temperature calibration device, comprising:
    a block of thermally conductive material that is structured to be placed in thermal communication with a device to be calibrated;
    a plurality of Peltier cells in thermal contact with the block of thermally conductive material; and
    a power controller coupled to the Peltier cells, the power controller being structured to apply power to the Peltier cells and to change the power applied to the Peltier cells from a starting power to an intermediate power, to hold the power applied to the Peltier cells at the intermediate power for a period of constant power, and to then change the power applied to the Peltier cells to a target power, wherein the power controller is structured to gradually change the power applied to the Peltier cells from the intermediate power to the target power.

25. A temperature calibration device, comprising:
- a block of thermally conductive material that is structured to be placed in thermal communication with a device to be calibrated;
- a plurality of Peltier cells in thermal contact with the block of thermally conductive material; and
- a power controller coupled to the Peltier cells, the power controller being structured to apply power to the Peltier cells and to change the power applied to the Peltier cells from a starting power to an intermediate power, to hold the power applied to the Peltier cells at the intermediate power for a period of constant power, and to then change the power applied to the Peltier cells to a target power, wherein the plurality of Peltier cells a placed on each other in at least one stack Peltier cells having an inner Peltier cell placed on the block of thermally conductive material, a middle Peltier cell placed on the inner Peltier cell, and an outer Peltier cell placed on the middle Peltier cell.

* * * * *

UNITED STATES PATENT AND TRADEMARK OFFICE
CERTIFICATE OF CORRECTION

PATENT NO.         : 7,669,427 B2                                        Page 1 of 1
APPLICATION NO. : 11/453781
DATED                  : March 2, 2010
INVENTOR(S)        : Richard W. Walker and Frank E. Liebmann It is certified that error appears in the above-identified patent and that said Letters Patent is hereby corrected as shown below:

| Column, Line | Reads | Should Read |
| --- | --- | --- |
| Column 3, Line 7 | "FIG. 1 an exploded" | --FIG. 1 is an exploded-- |
| Column 3, Line 29 | "affective the service life" | --affecting the service life-- |
| Column 3, Line 52 | "upper Peltierheat-" | --upper Peltier heat-- |
| Column 5, Lines 10, 15, 18, 20-21, 41 & 55 | "40, 44, 60, 66" | --40, 44, 60, 62-- |
| Column 6, Line 7 | "40, 44, 60, 66" | --40, 44, 60, 62-- |
| Column 10, Line 4 | "Peltier cells a placed on each" | --Peltier cells are placed on each-- |
| Column 10, Line 5 | "one stack, Peltier cells having an" | --one stack, the plurality of Peltier cells having an-- |

Signed and Sealed this

Eighteenth Day of May, 2010

David J. Kappos
*Director of the United States Patent and Trademark Office*